United States Patent

Smith et al.

[11] Patent Number: 4,689,557
[45] Date of Patent: Aug. 25, 1987

[54] IN-AXLE VEHICLE WHEEL SPEED SENSING DEVICE

[75] Inventors: Francis H. Smith, Birmingham; Norman Tait, Warwick, both of England

[73] Assignee: Lucas Industries Public Limited Company, England

[21] Appl. No.: 824,731

[22] Filed: Jan. 31, 1986

[30] Foreign Application Priority Data

Feb. 6, 1985 [GB] United Kingdom ............... 8502944

[51] Int. Cl.[4] ............................................. G01P 3/487
[52] U.S. Cl. ..................................... 324/174; 340/671
[58] Field of Search ............... 73/129, 121; 188/1.11; 303/108; 160/167, 174, 179; 310/155; 324/174; 340/671

[56] References Cited

U.S. PATENT DOCUMENTS 3,473,120 10/1969 Rouf .............................. 324/174 X
3,870,911 3/1975 Toyama et al. ................ 324/174 X Primary Examiner—Jerry W. Myracle
Attorney, Agent, or Firm—Laff, Whitesel, Conte & Saret

[57] ABSTRACT

A wheel speed sensor comprises a non-magnetic spindle, a rotor of magnetic material carried by the spindle, a stator surrounding the rotor, a permanent magnet, a stationary hub of magnetic material in which the spindle is rotatably mounted, and a wire coil disposed for induction by current by changing magnetic fields caused by rotation of the rotor. The rotor and the hub are superimposed over the total length of the rotor, irrespective of the relative axial positions of the rotor and the hub due to the end float of the spindle. This ensures that the effective length of an air gap between the overlapping faces of the rotor and the hub remains substantially constant irrespective of any such end float. Thus the resistance of a magnetic flux path across the air gap will remain substantially constant.

6 Claims, 3 Drawing Figures

IN-AXLE VEHICLE WHEEL SPEED SENSING DEVICE

This invention relates to in-axle vehicle wheel speed sensing devices of the kind in which a wheel speed sensor assembly is housed within a longitudinal bore in a relatively stationary axle upon which a wheel is journalled for rotation, and the sensor assembly comprises a rotor assembly comprising a non-magnetic spindle, and a rotor of magnetic material carried by the spindle and provided in its peripheral edge with a plurality of angularly spaced teeth, a stator surrounding the peripheral edge of the rotor and provided with a plurality of angularly spaced teeth which correspond in number with, and are arranged in co-acting relationship with respect to, the teeth in the rotor, a permanent magnet disposed to generate magnetic flux through the rotor and the stator, a stationary hub of magnetic material in which the spindle is rotatably mounted and which provides a magnetic flux path between the magnet and the rotor across an air gap defined between the hub and the rotor, a wire coil disposed for induction by current by changing magnetic fields caused by rotation of the rotor of an e.m.f. in the form of an oscillatory signal utilized for a control module of anti-skid means, and a drive coupling for transmitting rotation of the wheel to the spindle.

In known sensing devices of the kind set forth the spindle is provided with a degree of end float in both directions to accommodate deflections, in an axial direction, of the drive coupling which may be caused by movement of the wheel relative to the axle in an axial direction, or rapid changes in the speed of the wheel. Since the air gap is defined between overlapping faces of the rotor and the hub, and the rotor is carried by the spindle, any end float of the spindle may alter the effective length of the air gap which, in turn, will alter the resistance of the magnetic flux path and hence the characteristics of the oscillatory signal. Relatively slow floating movements will vary the magnitude of the oscillatory signal, but relatively fast movements will induce a voltage, in its own right, which will transmit a spurious signal to the control module.

According to our invention in an in-axle vehicle wheel speed sensing device of the kind set forth the rotor and the hub are superimposed over the total axial length of the rotor irrespective of the relative axial positions of the rotor and the hub due to end float of the spindle.

This ensures that the effective length of the air gap defined between the overlapping faces of the rotor and the hub remains substantially constant irrespective of any end float of the spindle. Thus the resistance of the magnetic flux path will remain substantially constant.

Preferably the hub projects through the thickness of the rotor to accommodate the end float.

Some embodiments of our invention are illustrated in the accompanying drawings in which.

Figure 1:
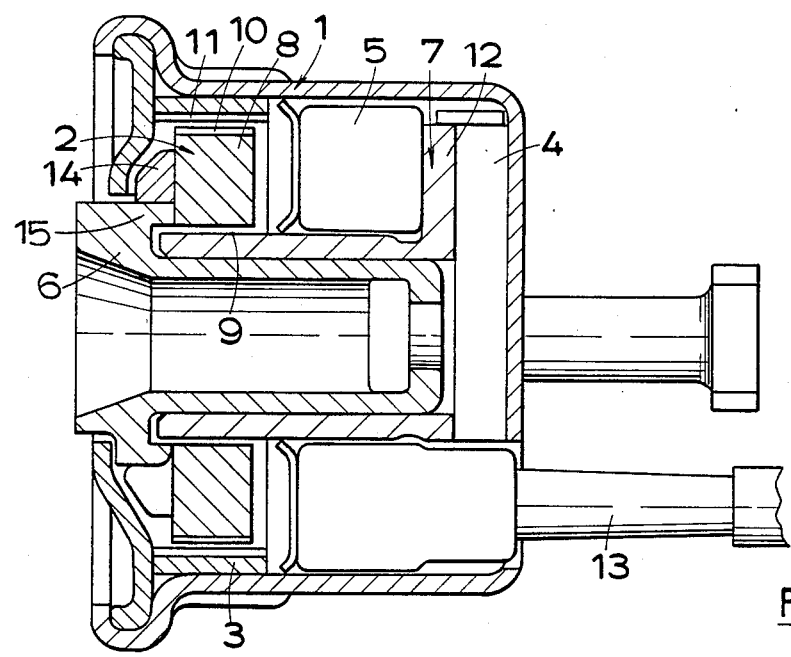
FIG. 1 is a longitudinal section through a wheel speed sensor assembly.

The assembly illustrated in FIG. 1 is adapted to be installed within a hollow, non-rotatable, axle of a vehicle. The assembly comprises a steel housing 1 in which is housed a rotor assembly 2, a stator 3, a permanent magnet 4, and a wire coil 5.

The rotor assembly 2 comprises a hollow spindle 6 of non-magnetic material which is journalled for rotation in the bore of a cylindrical part of a central hub 7 substantially of top-hat outline and of magnetic material, and a rotor 8 of annular outline which is carried at one end from the spindle 6. The rotor 8 has a inner peripheral edge which is superimposed upon, and spaced from, a complementary face of the hub 7 to define an air gap 9 and an outer peripheral edge provided with a plurality of angularly spaced teeth 10. The spindle 6 is driven from a wheel of the vehicle, which is journalled for rotation in the shaft, through a coupling.

The length of the hub 7 is chosen to ensure that the rotor 8 is at all times wholly superimposed upon the hub 7, irrespective of the relative axial positions of the spindle 6 and the hub 7 due to end-float caused by deflection of the coupling. This ensures that the effective length of the air gap 9 remains substantially constant at all times.

The stator 3 is of annular outline and encircles the rotor 8. The stator 3 is formed in its inner edge with angularly spaced teeth 11 corrresponding in number with, and arranged in co-acting relationship with respect to, the teeth 10.

The coil 5 is of annular outline and encircles the hub 7, being disposed between the rotor 8 and the stator 3, and a radial flange 12 on the hub 7 between which and the housing 1 the magnet 4 is located. The hub 7 and the housing 1 complete a magnetic flux path through the rotor 8 and the stator 3 so that an e.m.f. is induced in the coil 5 when the rotor 8 is rotated.

A signal, which is oscillatory in nature, is transmitted to a control module from a take-off connection 13 from the coil 5.

In the assembly described above, the rotor 2 is carried from the spindle 6 by means of angularly spaced radial lugs 14 which project from a radial flange 15 on the spindle 6. The flange 15 extends beyond the outer surface of the cylindrical part of the hub 7.

Figure 2:
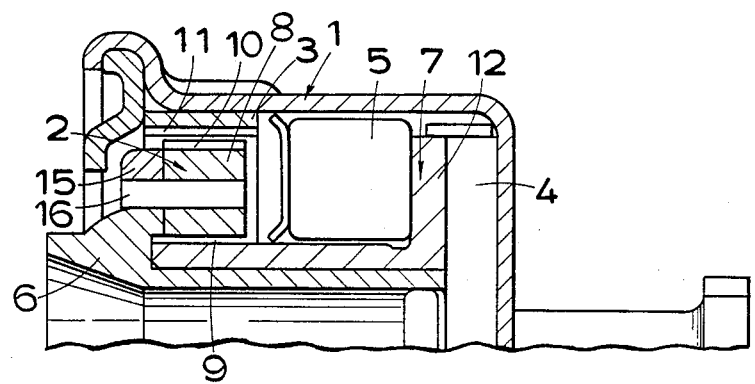
FIG. 2 is a section similar to FIG. 1 of one half of the assembly but showing a modified construction.

In the sensor assembly of FIG. 2 the radial flange 15 on the spindle 6 is connected to the rotor 8 by means of angularly spaced pins 16.

Figure 3:
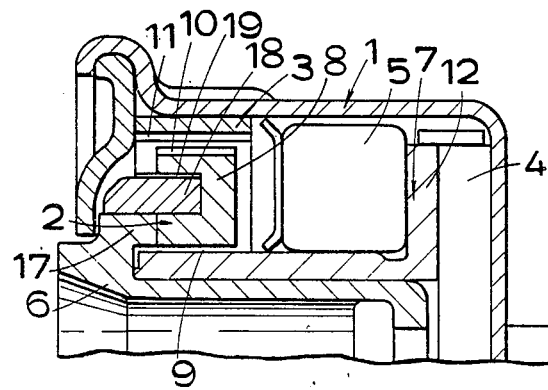
FIG. 3 is a section similar to FIG. 2 but showing yet another modification.

In the sensor assembly of FIG. 3 a radial flange 17 on the spindle 6 is provided with an axially extending skirt 18 which is received in a circumferentially extending slot 19 in an adjacent end of the rotor.

The constructions of FIGS. 2 and 3 are otherwise the same as FIG. 1 and corresponding reference numerals have been applied to corresponding parts.

We claim:

1. An in-axle vehicle wheel speed sensing device having wheel speed sensor assembly means housed within a longitudinal bore in a relatively stationary axle upon which a wheel is journalled for rotation, the wheel speed sensor assembly means comprising a rotor assembly including a non-magnetic spindle, a rotor of magnetic material carried by said spindle and having a plurality of angularly spaced teeth on the peripheral edge thereof, a stator surrounding said peripheral edge of said rotor and having a plurality of angularly spaced teeth which correspond in number with, and are arranged in co-acting relationship with respect to, said teeth in said rotor, a permanent magnet disposed to generate magnetic flux through said rotor and said stator, a stationary hub of magnetic material in which said spindle is rotatably mounted and which provides a magnetic flux path between said magnet and said rotor and across an air gap defined between said hub and said rotor, means including a wire coil disposed in a magnetic field controlled by movement of said teeth on the peripheral edge of said rotor for induction of current responsive to changing magnetic fields caused by rotation of said rotor to provide an e.m.f. in the form of an oscillatory signal, and a drive coupling for transmitting a rotation of said wheel to said spindle, wherein said rotor and said hub are superimposed over the total axial length of said rotor irrespective of the relative axial positions of said rotor and said hub due to end float of said spindle.

2. A sensing device as claimed in claim 1, wherein said hub has a substantial axial length in comparison with said axial length of said rotor and projects through said rotor, said rotor having an inner peripheral edge which surrounds and is spaced from a complementary outer face of said hub to define said air gap therebetween.

3. A sensing device as claimed in claim 1, wherein said hub hs a cylindrical portion in which said spindle is rotatably mounted, said spindle has a radial flange which projects outwardly beyond said outer face of said cylindrical portion, and said rotor is of annular outline and is carried from said radial flange.

4. A sensing device as claimed in claim 3, wherein said rotor is carried from said radial flange by means of radial lugs.

5. A sensing device as claimed in claim 3, wherein said rotor is carried from said radial flange by means of angularly spaced pins.

6. A sensing device as claimed in claim 3, wherein said rotor is carried from said radial flange by means of an axially extending skirt, and said rotor is provided in the end thereof adjacent to said flange with a circumferentially extending slot in which said skirt is received.

* * * * *